Aug. 2, 1960 T. B. TOMLINSON 2,947,874

ELECTRICAL SWITCHING ARRANGEMENTS

Filed May 6, 1957 3 Sheets-Sheet 1

INVENTOR
TERENCE BERNARD TOMLINSON
BY
Kirschstein, Kirschstein & Ottinger
ATTORNEYS INVENTOR
TERENCE BERNARD TOMLINSON
BY [signature]
ATTORNEYS Aug. 2, 1960 T. B. TOMLINSON 2,947,874
ELECTRICAL SWITCHING ARRANGEMENTS
Filed May 6, 1957 3 Sheets-Sheet 3

INVENTOR
TERENCE BERNARD TOMLINSON
BY [signature]
ATTORNEYS

United States Patent Office 2,947,874

Patented Aug. 2, 1960

2,947,874

ELECTRICAL SWITCHING ARRANGEMENTS

Terence Bernard Tomlinson, Harrow, England, assignor to The General Electric Company Limited, London, England Filed May 6, 1957, Ser. No. 657,334

Claims priority, application Great Britain May 14, 1956

11 Claims. (Cl. 250—208)

Figure 1:
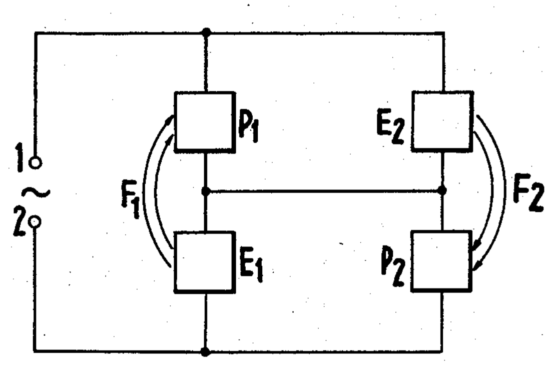

This invention relates to electrical switching circuit arrangements for performing binary switching operations, and to combinations of such circuit arrangements for producing particular switching actions.

Arrangements of this kind are used, for example, in counting circuits, gating circuit and other similar circuits required to be switched from one condition to another, and hitherto have made use in general of thermionic or cold-cathode valves, or electromagnetic relays, for performing the switching operations.

The main object of the present invention is to provide a novel form of binary switching arrangement which makes use of the phenomena of photoconductivity and electroluminescence and which might for some uses have the particular advantages of relatively small bulk and low power consumption.

According to the invention an electrical switching circuit arrangement comprises two input terminals arranged to be connected for operation of the arrangement to the terminals of an electrical supply, and two branch circuits each comprising a photoconductive element in series with an electroluminescent element, the two branch circuits being connected to the input terminals in reverse parallel with each other as regards the order of said elements, and the junctions of the photoconductive and electroluminescent elements of the two branches being connected together, so that in operation a reduction in the impedance of the photoconductive element of either one branch results in a reduction in the voltage applied across the electroluminescent element of the other branch and an increase in the voltage applied across the electroluminescent element in the same branch, each photoconductive element being sensitive to, and arranged to receive at least part of, the radiations emitted by its series-connected electroluminescent element when the latter is excited to luminescence, and the arrangement being such that in operation the circuit takes up one of two stable conditions with one of the photoconductive elements in a highly conducting state owing to the radiations incident upon it from the corresponding series-connected electroluminescent element, which is excited to relatively high brightness, the second electroluminescent element being at relatively low brightness or extinguished, and such that when the second photoconductive element receives radiations to which it is sensitive, at intensities above a critical level, the circuit takes up the second stable condition with the second photoconductive element in a highly conducting state, the second electroluminescent element excited to relatively high brightness, and the first electroluminescent element at relatively low brightness or extinguished.

The incident radiations for changing the circuit from one condition to another can be arranged to be applied from an external source in the form of pulses and the circuit can be arranged to act as a scale-of-two counter if the input pulses are incident on the two photoconductive elements alternately. The feed-back from the electroluminescent elements to the respective photoconductive elements when the former are excited should, of course, be of sufficiently high intensity to maintain the photoconductive elements in the conducting condition when said incident radiations are removed.

Preferably the spectral responses of each photoconductive element and its associated electroluminescent element, hereinafter referred to for simplicity as an electro-optical pair, have their maxima as near as possible, the responses preferably being narrow and over-lapping as completely as can be obtained.

The photoconductive elements may be arranged to be sensitive to either visible or non-visible radiations by the use of suitable photoconductive materials, and hereinafter the word "light" includes both visible and non-visible radiations unless otherwise stated. Each photoconducting element should, of course, be such that, when illuminated by the corresponding series-connected electroluminescent element, its impedance is much less than that of the other elemtroluminescent element, and when non-illuminated its "dark" impedance is higher than that of its series-connected electroluminescent element.

The electrical supply used for effecting the operation of the circuit arrangement will depend on the nature of the electroluminescent material employed and will, in general, be an alternating current supply since the most commonly employed electroluminescent materials, for example zinc sulphide or zinc-cadmium sulphide, exhibit luminescence when subjected to a varying electric field.

However some electroluminescent materials, in particular some materials in the form of single crystals, can be excited to luminescence when subjected to a unidirectional electric field, and where such materials are used in forming the electroluminescent elements, a direct current supply might then be employed.

The magnitude of the voltage employed should, of course, be such that only one electroluminescent element is excited to the relatively bright condition at a time, but that either one of these elements can be steadily maintained in the relatively bright condition until the reception of a subsequent light pulse.

Where the two branch circuits are nominally identical, a single input light pulse incident on both photoconductive elements simultaneously, provided its intensity is above said critical value, can be arranged to effect a change-over from one stable condition to another, since most photoconductors are more sensitive at conditions of lower illumination.

Figure 2:
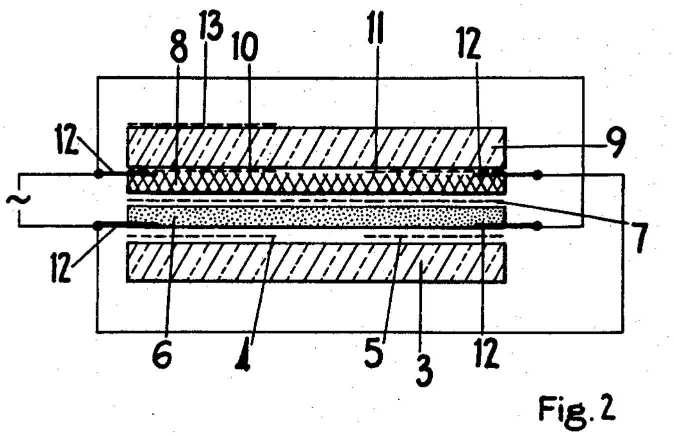

In the drawings in which are shown various possible embodiments of the invention, Fig. 1 is a diagrammatic representation of a switching circuit in accordance with the present invention;

Fig. 2 is a sectional view through a device which incorporates the circuit of Fig. 1; and Figs. 3, 4, 5 and 6 are diagrammatic representations of other circuits embodying various modified forms of the invention.

Thus referring to Figure 1 of the drawing the circuit arrangement shown therein includes a first photoconductive element $P_1$ connected in series with an electroluminescent element $E_1$ between two input terminals 1, 2. The material forming the electroluminescent element $E_1$ is excitable by a varying electric field, and the input terminals 1, 2, are arranged to be connected in operation of the arrangement to an alternating current supply of constant R.M.S. voltage so that the photoconductive element $P_1$ controls the voltage applied across the electroluminescent element $E_1$ as its impedance is varied by incident radiations, a decrease in the impedance of the photoconductive element $P_1$ increasing the voltage applied across the electroluminescent element $E_1$. The photoconductive material employed is one which is sensitive to radiations emitted by the electroluminescent element $E_1$ and the elements are so arranged that the output of the electroluminescent element is directed on to the photoconductive element as indicated by the arrows $F_1$. Also connected between the input terminals 1, 2, in series with a corresponding electroluminescent element $E_2$ is a second photoconductive element $P_2$, the latter elements being similar to the elements $P_1$, $E_1$, but being connected to the input terminals 1, 2, in the reverse order; the output of the element $E_2$ is arranged to be directed on to the photoconductive element $P_2$ as indicated by the arrows $F_2$. The junction of the elements $P_1$ and $E_1$ is connected directly to the junction of the elements $P_2$, $E_2$, so that the voltage appearing across the photoconductive element $P_1$ is the same as that appearing across the electroluminescent element $E_2$, and the voltage appearing across the other photoconductive element $P_2$ is the same as that appearing across the electroluminescent element $E_1$.

The amount of light fed back from each electroluminescent element to the corresponding photoconductive element and the magnitude of the applied voltage are such that, in operation, the arrangement takes up a first stable condition with one of the electroluminescent elements fully bright and the other virtually extinguished.

Assuming the electroluminescent element $E_1$ is in the fully bright condition, then in operation of the arrangement, if the photoconductive element $P_2$ is exposed to light of a sufficiently high intensity from an external source, its impedance will drop and this will produce two further effects, namely:

(*a*) the voltage across the electroluminescent element $E_1$ will be reduced, causing its light output to decrease, and (*b*) the voltage across the electroluminescent element $E_2$ will be increased, leading to an increased light output from it.

As a result of (*a*) the impedance of the photoconductive element $P_1$ is increased and as a result of (*b*) the impedance of the photoconductive element $P_2$ is further decreased. These effects are mutually assisting and regenerative and the arrangement finally assumes a second stable condition with the electroluminescent element $E_2$ fully bright and the element $E_1$ virtually extinguished. Because of its symmetrical construction the arrangement can be switched back to the first stable condition by applying light to the photoconductive element $P_1$.

Because of the regenerative feedback inherent in the device, the arrangement will normally assume the condition where one electroluminescent element is excited and the other virtually extinguished even though no light is incident on either of the photoconductive elements from an external source.

The state of the circuit at any instant can be read off by direct observation of the two electroluminescent elements $E_1$ and $E_2$. Alternatively, an electrical output signal may be obtained, for example by using the voltage changes appearing across either one of the electroluminescent elements or by directing the output of one of the elements on to a subsidiary photoconductive member $P_3$, as illustrated diagrammatically in Figures 3 and 4 respectively.

Figure 3:
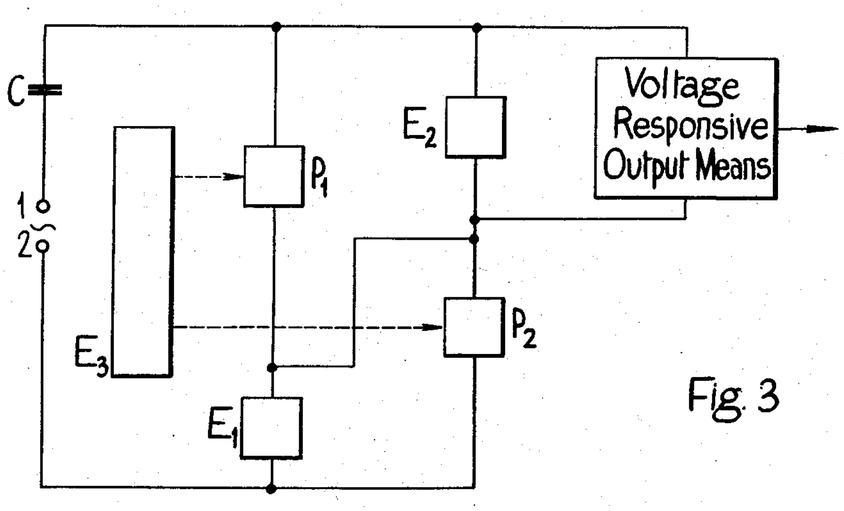
Figure 4:
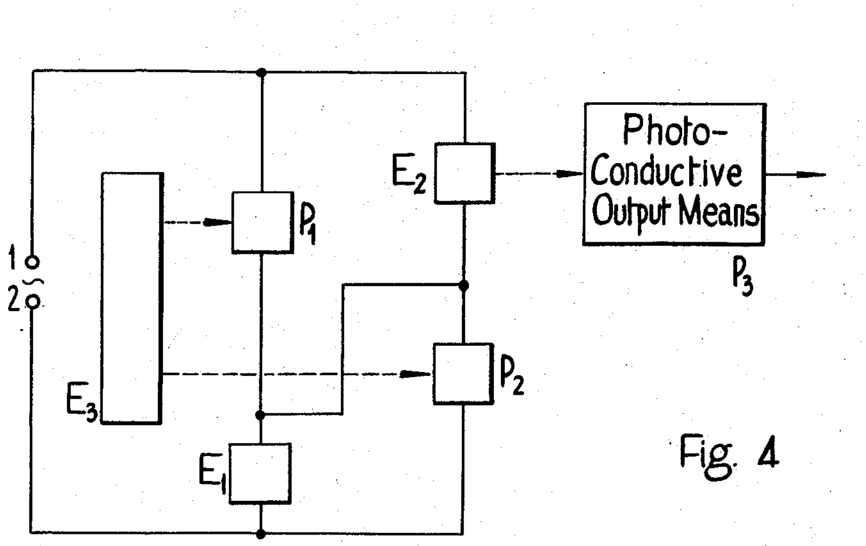

The controlling light signals are conveniently obtained in pulse form by means of a subsidiary electroluminescent element $E_3$, also shown in Figures 3 and 4 arranged to be excited by a pulsed alternating current, and whose output is directed on to both photoconductive elements $P_1$ and $P_2$, a light pulse produced by the subsidiary electroluminescent element producing a changeover from either one of the two stable conditions to the other.

This is possible since a photoconductive element which is non-illuminated is more sensitive than an illuminated element, owing to the higher voltage across it and because the photoconducting material is more sensitive at a lower illumination. The circuit is therefore reversible, there being one output signal from either of the electroluminescent elements for every two input pulses.

The photoconductive elements can conveniently be disposed side by side facing in the same direction, and this facilitates the construction of the whole circuit arrangement as a compact unitary device; one such device is shown schematically in section in Figure 2.

Thus referring to Figure 2 the device shown therein comprises a transparent glass plate 3 coated on different parts of one surface with two transparent conducting films 4, 5, these being conveniently formed in known manner by a process involving the use of stannic or stannous chloride. A layer 6 of electroluminescent material such as silver-activated zinc sulphide emitting visible light, extends over the whole of these coatings and this is covered in turn by a low impedance connecting member 7 in the form of a wire-mesh grid. Over the wire-mesh electrode member 7 extends a layer 8 of photoconductive material, such as suitably activated cadmium sulphide, sensitive to light emitted by the electroluminescent layer when excited, and over this is placed a second glass plate 9 coated on its adjoining face with two transparent conducting films 10, 11.

The conducting films 10, 11, are disposed immediately over the films 4, 5 respectively, so that the films 4, 10, sandwich between them one part of the electroluminescent and photoconductive layers and the films 5, 11, sandwich between them another part of these layers.

The conducting film 4 is cross-connected to the film 11 and the conducting film 5 is connected to the film 10, connection to the films being made by means of strips 12 of metallic foil bonded to the respective films by means of a suitable conducting adhesive. The films 4, 11, are connected to one input terminal of the arrangement and the films 5, 10, are connected to a second input terminal of the arrangement, the input terminals conveniently being provided by an appropriate pair of the metal foil strips 12.

In some cases it may be advantageous to include an impedance in series with both electro-optical pairs with respect to the supply in operation of the arrangement, and by choosing an impedance of suitable magnitude the arrangement can be rendered more sensitive to the input light pulses. A circuit with such an impedance, which may for example consist of a capacitor 6 is illustrated in Figure 3.

Where the arrangement is in the form of a unitary device as previously described with reference to Figure 2, a capacitive impedance of this kind can be included as part of the device if desired. This can be effected by making one of the plates 3 or 9 sufficiently thin and coating the part of the outer surface over a transparent conducting film to which connection is made to the supply with a further transparent conducting film, for example as indicated by the broken line 13, the connection from the supply being made to the latter film 13 instead of to the film in contact with the photoconductive or electroluminescent layer, as the case may be. The capacitance provided by the part of the plate between the film 13 and the adjacent film 4, 5, 10 or 11 then provides the impedance as aforesaid. The connecting member 7, instead of being in wire-mesh form, could, if desired, comprise a transparent insulating support coated on each surface with a transparent conducting film, with the films connected to each other for operation of the device.

Figure 5:
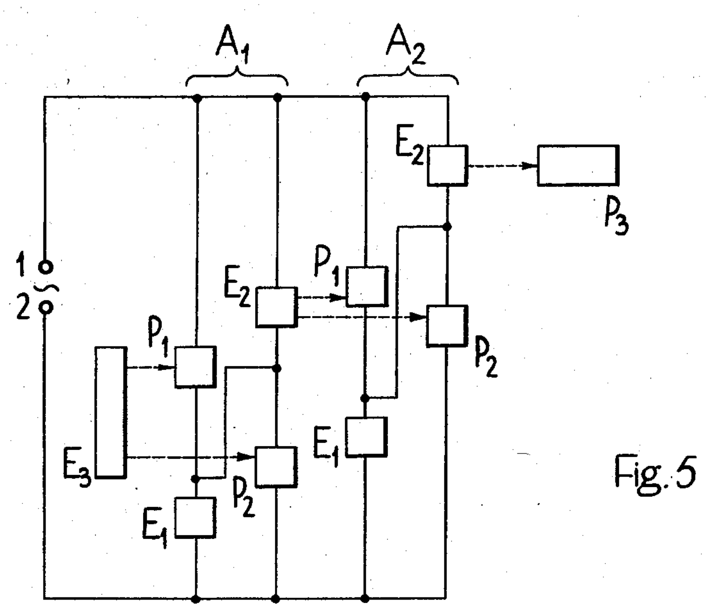
Figure 6:
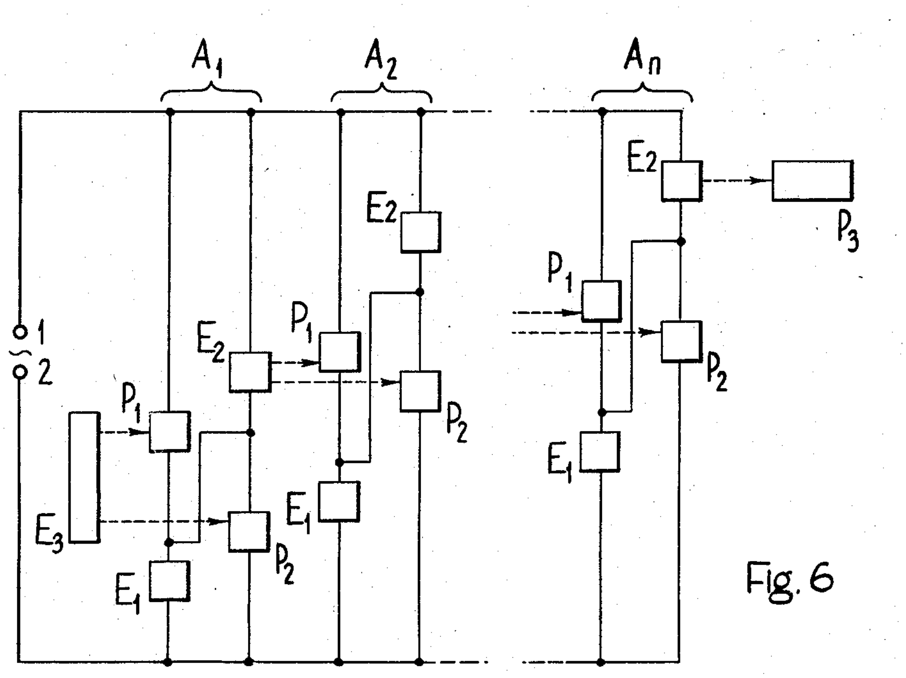

It will be appreciated that a compound circuit arrangement can be built up using a number of simple circuits as previously described, and by employing a chain of devices such as that shown in Figure 2 with the output of the electroluminescent elements of one device incident on the photoconductive elements of the succeeding device, a multiple scale-of-two counter can readily be constructed. Two such arrangements are illustrated in Figures 5 and 6. The circuit illustrated in Figure 5 comprises a combination of two circuits of the form shown in Figure 1, input light signals being arranged to be incident, for example from an electroluminescent element $E_3$ on both photoconductive elements of the first circuit $A_1$ and the output of one of the electroluminescent elements of the first circuit being incident on both photoconductive elements of the second circuit $A_2$. With such an arrangement each electroluminescent element of the second circuit $A_2$ gives a single output light pulse for every four input signals. The output from one of the electroluminescent elements of the second circuit $A_2$ can be directed on to a photoconductive output means $P_3$ as in the arrangement illustrated in Figure 4. The arrangement of Figure 6 is similar to that illustrated in Figure 5 except that it comprises a combination of at least three, say *n*, arrangements of the form illustrated in Figure 1, arranged in sequence. Each electroluminescent element of the last arrangement $A_n$ then provides a single output light pulse for every $2^n$ input pulses applied to the photoconductive elements of the first circuit $A_1$. A compound circuit arrangement such as those described can be formed as a compact unit which does not necessitate the use of a large number of additional circuit elements as do similar circuit arrangements employing thermionic or cold cathode valves for performing the switching action.

Other compound circuit arrangements containing a number of simple arrangements as described with reference to Figures 1 and 2, for performing different switching operations, may obviously be constructed if desired.

I claim:

1. An electrical switching circuit arrangement comprising two input terminals arranged to be connected for operation of the arrangement to the terminals of an electrical supply, and two branch circuits each comprising a photoconductive element in series with an electroluminescent element, wherein the two branch circuits are connected to the input terminals in reverse parallel with each other as regards the order of said elements, and the junctions of the photoconductive and electroluminescent elements of the two branches are connected together by a low impedance path so that in operation of the arrangement a reduction in the impedance of the photoconductive element of either one branch results in a reduction in the voltage applied across the electroluminescent element of the other branch and an increase in the voltage applied across the electroluminescent element in the same branch, and wherein each photoconductive element is sensitive to, and is located so as to receive at least part of, the radiations emitted by its series-connected electroluminescent element when the latter is excited to luminescence, the circuit taking up in operation one of two stable conditions with one of the photoconductive elements in a highly conducting state owing to the radiations incident upon it from the corresponding series-connected electroluminescent element, which is excited to relatively high brightness, the second electroluminescent element being at relatively low brightness or extinguished, and such that when the second photoconductive element receives radiations to which it is sensitive, at intensities above a critical level, the circuit takes up the second stable condition with the second photoconductive element in a highly conducting state, the second electroluminescent element excited to relatively high brightness, and the first electroluminescent element at relatively low brightness or extinguished.

2. An electrical switching circuit arrangement according to claim 1 wherein the photoconductive elements and the electroluminescent elements are so constructed and arranged that the circuit remains in the second stable condition after the cessation of the incident radiations, and the circuit is associated with means for directing radiations at intensities above said critical level on to the first photoconductive element, when the circuit is in the second stable condition, for causing the circuit to return to the first stable condition.

3. An electrical switching circuit arrangement according to claim 1 wherein the electroluminescent element and photoconductive element of both branches are formed as a single unitary device with the photoconductive elements facing in the same direction, and wherein the circuit elements in the two branches are matched so that the circuit arrangement can be changed from each one of its stable conditions to the other by input radiations having intensities above said critical level and incident on both photoconductive elements simultaneously.

4. An electrical switching circuit arrangement according to claim 3 wherein the said single unitary device comprises a layer of photoconductive material, a first pair of light-permeable conducting layer electrodes extending over different regions of one surface of the photoconductive layer and insulated from each other, a common light-permeable conducting layer extending over the opposite surface of the photoconductive layer, a layer of electroluminescent material extending over the surface of the common conducting layer remote from the photoconductive layer, and a second pair of light-permeable conducting layer electrodes insulated from each other and each extending over a region of the surface of the electroluminescent layer, remote from the common conducting layer, corresponding to a region of the photoconductive layer which is associated with a respective one of the first pair of light-permeable conducting layer electrodes.

5. A unitary device suitable for use in an electrical switching circuit arrangement according to claim 4 comprising a layer of photoconductive material, a first pair of light-permeable conducting layer electrodes extending over different regions of one surface of the photoconductive layer and insulated from each other, a common light-permeable conducting layer extending over the opposite surface of the photoconductive layer, a layer of electroluminescent material extending over the surface of the common conducting layer remote from the photoconductive layer, and a second pair of light-permeable conducting layer electrodes insulated from each other and each extending over a region of the surface of the electroluminescent layer, remote from the common conducting layer, corresponding to a region of the photoconductive layer which is associated with a respective one of the said first pair of light-permeable conducting electrodes.

6. A unitary device according to claim 5 wherein the first pair of conducting electrodes are formed as two transparent conducting films applied to different regions of the surface of a first transparent insulating support, and the said second pair of conducting electrodes are formed as transparent conducting films applied to corresponding regions of the surface of another transparent insulating support, and the electroluminescent and photoconductive layers and the said common conducting layer are sandwiched between the coated surfaces of the two supports.

7. An electrical switching circuit arrangement according to claim 1 including an impedance connected in series with both branch circuits with respect to the input terminals.

8. An electrical switching circuit arrangement according to claim 7 for use on alternating current supplies wherein the said impedance is a capacitor.

9. A unitary device according to claim 5 wherein each of the first pair of light permeable conducting layer electrodes is connected to the one of the second pair of light permeable conducting layer electrodes located diagonally opposite to it by mutually-insulated conductors, and the device includes a pair of input terminals and a capacitor formed as an integral part of the device, and wherein one of which terminals is connected to a said conductor in series with the capacitor and the other terminal is connected to the other conductor.

10. The combination of two electrical switching circuit arrangements according to claim 1, with means for directing a series of input light pulses on to the photoconductive elements of one of the circuit arrangements, the circuit arrangements being so disposed that the output of one of the electroluminescent elements of said one circuit arrangement is incident upon the photoconductive elements of the other circuit arrangement, whereby each electroluminescent element of the second circuit arrangement gives a single output light pulse for every four input pulses applied to the photoconductive elements of the first circuit arrangement.

11. A multiple scale-of-two counter including at least three electrical switching circuit arrangements according to claim 1, arranged in sequence such that the output of one electroluminescent element of each circuit arrangement, except the last, is incident upon the photoconductive elements of the next circuit arrangement, and means for directing a series of input light pulses on to the photoconductive elements of the first circuit arrangement, and wherein each electroluminescent element of the last circuit arrangement in the sequence gives a single output light pulse for every $2^n$ input pulses applied to the photoconductive elements of the first circuit arrangement, where $n$ is the number of circuit arrangements employed.

References Cited in the file of this patent

UNITED STATES PATENTS

| | | |
|---|---|---|
| 2,727,683 | Allen et al. | Dec. 20, 1955 |
| 2,773,992 | Ullery | Dec. 11, 1956 |
| 2,790,088 | Shive | Apr. 23, 1957 |
| 2,895,054 | Loebner | July 14, 1959 |
| 2,900,522 | Reis | Aug. 18, 1959 |
| 2,907,001 | Loebner | Sept. 29, 1959 |

OTHER REFERENCES

"Photoconductive Films," Quarterly Report No. 6, Second Series of the Computer Components Fellowship No. 346, Mellon Institute of Industrial Research. Jan. 1, 1955 to Mar. 31, 1955.

"Electro-Optical Transducers or Switches," Quarterly Report, No. 3, Second Series of the Computer Components Fellowship No. 347, Mellon Institute of Industrial Research. April 1, 1954 to June 30, 1954.

Loebner: Proceedings of the IRE; vol. 43; No. 12; Dec. 1955, pages 1897–1906.

Marshall, Jr.: Proceedings of the Ass'n of Computing Machinery; May 2, 3, 1952; pages 159–163.

Tomlinson: Journal of the British Institution of Radio Engineers; vol 17; No. 3, March 1957, pages 141–154.